United States Patent
Rachi

(10) Patent No.: US 10,260,669 B2
(45) Date of Patent: Apr. 16, 2019

(54) ELECTRIC WIRE PROTECTION MEMBER AND WIRE HARNESS

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventor: Hironobu Rachi, Yokkaichi (JP)

(73) Assignees: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 16/060,459

(22) PCT Filed: Dec. 8, 2016

(86) PCT No.: PCT/JP2016/086620
§ 371 (c)(1),
(2) Date: Jun. 8, 2018

(87) PCT Pub. No.: WO2017/110512
PCT Pub. Date: Jun. 29, 2017

(65) Prior Publication Data
US 2018/0363831 A1    Dec. 20, 2018

(30) Foreign Application Priority Data
Dec. 24, 2015    (JP) .................................. 2015-252513

(51) Int. Cl.
*H01B 7/00* (2006.01)
*F16L 58/04* (2006.01)
(Continued)

(52) U.S. Cl.
CPC .......... *F16L 58/04* (2013.01); *B60R 16/0215* (2013.01); *H01B 7/0045* (2013.01);
(Continued)

(58) Field of Classification Search
CPC .. H02G 3/0462; H02G 3/0481; H02G 15/007; H01B 7/0045; H01B 7/18;
(Continued)

(56) References Cited

U.S. PATENT DOCUMENTS 4,606,953 A      8/1986  Suzuki et al.
4,685,985 A *    8/1987  Stueke ................... B05D 7/148
                                                           156/185
(Continued)

FOREIGN PATENT DOCUMENTS

JP    2002294021 A    10/2002
JP    2004225363 A    8/2004

OTHER PUBLICATIONS

International Search Report and Written Opinion for Application No. PCT/JP2016/086620 dated Jan. 24, 2017; 5 pages.

*Primary Examiner* — Angel R Estrada
(74) *Attorney, Agent, or Firm* — Reising Ethington, P.C.

(57) ABSTRACT

An electric wire protection member capable of suppressing the occurrence of breakage and swelling of a resin coating and separation of the resin coating from a metal pipe for a long period of time, and a wire harness including the electric wire protection member. The electric wire protection member includes a metal pipe into which an electric wire is to be inserted, and a resin coating that covers an outer surface of the metal pipe. The resin coating has at least one of a glass
(Continued)

transition point of 40° C. or higher and a water vapor permeability coefficient of 260 g·mm/m²·24 hr or less, and has a thickness of 30 μm or more.

4 Claims, 1 Drawing Sheet

(51) Int. Cl.
  *H01B 7/18* (2006.01)
  *H01B 7/36* (2006.01)
  *B60R 16/02* (2006.01)
  *H02G 3/04* (2006.01)
  *F16L 9/147* (2006.01)

(52) U.S. Cl.
  CPC .............. *H01B 7/18* (2013.01); *H01B 7/36* (2013.01); *H02G 3/0462* (2013.01); *H02G 3/0481* (2013.01); *F16L 9/147* (2013.01)

(58) Field of Classification Search
  CPC ........ H01B 7/36; H01B 11/1834; H01B 7/00; B60R 16/0215; F16L 58/04; F16L 9/147
  USPC ....... 174/68.3, 68.1, 72 A, 72 C, 88 R, 70 C, 174/122 C, 120 R, 138 R, 120 C, 110 R, 174/119 C, 122 G; 138/103, 118.1, 134, 138/146; 285/45, 351; 428/34.5, 35.7
  See application file for complete search history.

(56) References Cited

U.S. PATENT DOCUMENTS

| | | | | |
|---|---|---|---|---|
| 4,853,297 | A * | 8/1989 | Takahashi | F16L 53/08 428/623 |
| 5,300,336 | A * | 4/1994 | Wong | B05D 7/148 138/137 |
| 5,972,540 | A | 10/1999 | Lee | |
| 6,235,361 | B1 * | 5/2001 | Jacquemet | B05D 7/148 428/35.7 |
| 6,397,895 | B1 * | 6/2002 | Lively | C09D 163/00 138/146 |
| 7,563,496 | B2 * | 7/2009 | Watson | B29C 63/18 405/211.1 |
| 7,776,441 | B2 * | 8/2010 | Mhetar | C08L 53/00 174/110 R |
| 8,704,096 | B2 * | 4/2014 | Watanabe | C23C 26/00 174/126.1 |
| 8,759,681 | B2 * | 6/2014 | Doi | B60R 16/0215 174/117 A |
| 9,197,042 | B2 * | 11/2015 | Toyama | B60R 16/0207 |
| 9,688,875 | B2 * | 6/2017 | Chang | C08G 59/5073 |
| 2001/0008665 | A1 | 7/2001 | Hsich et al. | |
| 2002/0182357 | A1 | 12/2002 | Soles et al. | |
| 2003/0012907 | A1 | 1/2003 | Hsich et al. | |
| 2015/0179308 | A1 | 6/2015 | Inao et al. | |

* cited by examiner

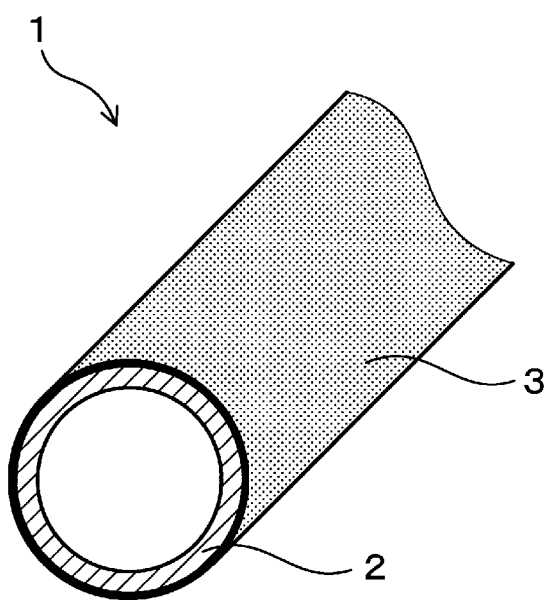

ELECTRIC WIRE PROTECTION MEMBER AND WIRE HARNESS

CROSS REFERENCE TO RELATED APPLICATIONS

This application claims the priority of Japanese patent application JP2015-252513 filed on Dec. 24, 2015, the entire contents of which are incorporated herein.

TECHNICAL FIELD

The present invention relates to an electric wire protection member and a wire harness including the electric wire protection member.

BACKGROUND ART

A wire harness to be arranged in a vehicle such as an automobile includes an electric wire and an electric wire protection member for protecting the electric wire. In some cases, a high-voltage electric wire such as an electric wire for connecting a battery and an engine is inserted into the electric wire protection member, for example.

This type of electric wire protection member includes a pipe made of aluminum in many cases. The surface of the electric wire protection member is colored a certain color such that the insertion of the high-voltage electric wire can be visually confirmed during the arrangement of the wire harness, the removal of the wire harness, and the like. For example, Patent Documents 1 (JP2014-50267A) and 2 (JP2014-50268A) disclose a technique of forming an identification mark on a portion of the outer surface of the pipe body, using a coloring agent such as paint or tape.

SUMMARY

The identification mark is arranged on the outer surface of the electric wire protection member and is thus sometimes exposed to moisture such as rain or dew condensation. A conventional identification mark is problematic in that adhesion between paint or the like forming the identification mark and a metal pipe deteriorates due to exposure to moisture, and breakage, swelling, and separation from the metal pipe occurs in a relatively short period of time.

The present disclosure was achieved in view of the above-described circumstance, and provides an electric wire protection member capable of suppressing the occurrence of breakage and swelling of a resin coating and separation of the resin coating from a metal pipe for a long period of time, and a wire harness including the electric wire protection member.

Solution to Problem

An aspect of the present disclosure is an electric wire protection member including:
a metal pipe into which an electric wire is to be inserted; and
a resin coating that covers an outer surface of the metal pipe,
wherein the resin coating has
at least one of a glass transition point of 40° C. or higher and a water vapor permeability coefficient of 260 g·mm/m$^2$·24 hr or less, and
a thickness of 30 μm or more.

The above-mentioned electric wire protection member includes the above-mentioned resin coating that has at least one of a glass transition point of 40° C. or higher and a water vapor permeability coefficient of 260 g·mm/m$^2$·24 hr or less, and has a thickness of 30 μm or more. Setting at least one of the glass transition point and the water vapor permeability coefficient of the resin coating to be within the above-mentioned respective specific ranges as well as setting the thickness of the resin coating to be within the above-mentioned specific range makes it possible to suppress the deterioration of the adhesion of the above-mentioned resin coating to the above-mentioned metal pipe due to contact with moisture. As a result, the occurrence of breakage and swelling of the resin coating and separation of the resin coating from the metal pipe can be suppressed for a long period of time. Such an effect is evident from Experimental Examples, which will be described later.

BRIEF DESCRIPTION OF DRAWINGS

The FIGURE is a perspective view of an electric wire protection member of an example.

DESCRIPTION OF EMBODIMENTS

In the above-mentioned electric wire protection member, the metal pipe is generally made of aluminum or an aluminum alloy from the viewpoint of a reducing the weight of a wire harness.

The resin coating that covers the outer surface of the metal pipe has at least one of a glass transition point of 40° C. or higher and a water vapor permeability coefficient of 260 g·mm/m$^2$·24 hr or less. Moisture attached to the surface of the resin coating diffuses and permeates the inside of the resin coating. The moisture that reaches the interface between the resin coating and the metal pipe causes deterioration of the adhesion between the resin coating and the metal pipe.

In contrast, a resin coating having a glass transition point of 40° C. or higher has a relatively high cross-linking density, and therefore, the permeation of moisture into the resin coating can be suppressed. From the viewpoint of further suppressing the permeation of moisture, the glass transition point is preferably 43° C. or higher, more preferably 47° C. or higher, and even more preferably 50° C. or higher.

Moreover, in the case of a resin coating having a water vapor permeability coefficient of 260 g·mm/m$^2$·24 hr or less as well, similarly to the description above, the permeation of moisture into the resin coating can be suppressed. From the viewpoint of further suppressing the permeation of moisture, the water vapor permeability coefficient is preferably 250 g·mm/m$^2$·24 hr or less, more preferably 240 g·mm/m$^2$·24 hr or less, and even more preferably 230 g·mm/m$^2$·24 hr or less.

The thickness of the resin coating is set to 30 μm or more. Setting the thickness of the resin coating to 30 μm or more makes it possible to reduce the amount of moisture that reaches the interface between the resin coating and metal pipe. From the viewpoint of further reducing the amount of moisture that reaches the interface therebetween, the thickness of the resin coating is preferably set to 35 μm or more, more preferably 40 μm or more, and even more preferably 50 μm or more.

From the viewpoint of further reducing the amount of moisture that reaches the interface therebetween, it is preferable that the resin coating has a larger thickness. However, if the thickness of the resin coating is excessively large, there is a risk that the usage amount of paint increases, resulting in an increase in cost. From the viewpoint of reducing the usage amount of paint, the thickness of the resin coating is preferably set to 100 μm or less, more preferably 95 μm or less, and even more preferably 80 μm or less.

As described above, setting at least one of the glass transition point and the water vapor permeability coefficient of the resin coating to be within the above-mentioned respective specific ranges makes it possible to suppress the permeation of moisture into the resin coating. Moreover, setting the thickness of the resin coating to be within the above-mentioned specific range makes it possible to reduce the amount of moisture that reaches the interface between the resin coating and the metal pipe. Accordingly, setting at least one of the glass transition point and the water vapor permeability coefficient to be within the above-mentioned respective specific ranges as well as setting the thickness of the resin coating to be within the above-mentioned specific range makes it possible to suppress deterioration of the adhesion between the resin coating and the metal pipe due to contact with moisture.

The above-mentioned resin coating can be formed by applying paint containing a cross-linkable resin to the outer surface of the metal pipe and then cross-linking the cross-linkable resin. Examples of the cross-linkable resin include an epoxy resin, a polyester resin, an acrylic resin, a methacrylic resin, an epoxy-acrylic resin, a urethane-acrylic resin, a polyamide resin, and a silicone resin.

It is preferable that the resin coating contains any of a cross-linked acrylic resin, a cross-linked methacrylic resin, a cross-linked urethane-acrylic resin, and a cross-linked epoxy-acrylic resin. In this case, the glass transition point of the resin coating can be easily increased. Moreover, in this case, the heat resistance of the resin coating can be further increased, and separation of the resin coating can be made less likely to occur.

It is preferable that the resin coating is made of ultraviolet-curable paint. In this case, the paint applied to the metal pipe can be cured quickly. As a result, the productivity of the electric wire protection member can be further improved.

The resin coating may have a color such as an orange color that is different from the ground color of the metal pipe. In this case, it is easy to visually confirm the insertion of a high-voltage electric wire into the above-mentioned electric wire protection member during the arrangement of the wire harness, the removal of the wire harness, and the like, for example.

The wire harness includes the above-mentioned electric wire protection member and an electric wire inserted into the electric wire protection member. The wire harness may include one electric wire protection member or a plurality of electric wire protection members.

There is no particular limitation on the number of the electric wires inserted into the electric wire protection member, and a single electric wire or a plurality of electric wires can be inserted into the electric wire protection member depending on the application.

The wire harness having the above-mentioned configuration can be favorably used to connect a power conversion device and a battery, or a power conversion device and a motor, for example, in an electric car or a hybrid car.

EXAMPLES

Working Example

A working example of the above-mentioned electric wire protection member will be described with reference to the FIGURE. An electric wire protection member 1 includes a metal pipe 2 into which an electric wire is to be inserted, and a resin coating 3 that covers the outer surface of the metal pipe 2. The resin coating 3 has at least one of a glass transition point of 40° C. or higher and a water vapor permeability coefficient of 260 g·mm/m$^2$·24 hr or less, and a thickness of 30 μm or more.

Although not shown in the diagram, the electric wire protection member 1 of this working example into which an electric wire is inserted can be used to form a wire harness. The wire harness can be favorably used to connect a power conversion device and a battery, or a power conversion device and a motor, for example, in an electric car or a hybrid car.

The metal pipe 2 of this working example is a cylindrical straight pipe made of an aluminum alloy. It should be noted that the metal pipe 2 may be bent as appropriate depending on the arrangement form of the wire harness.

As shown in the FIGURE, the outer surface of the metal pipe 2 is covered with the resin coating 3. The resin coating 3 has an orange color. Accordingly, the insertion of a high-voltage electric wire into the electric wire protection member 1 can be visually confirmed in a state in which the electric wire protection member 1 is attached to a vehicle. The resin coating 3 of this working example can be formed by applying ultraviolet-curable resin paint to the outer surface of the metal pipe and then curing the paint with ultraviolet irradiation, for example. It should be noted that examples of the resin paint include acrylic resin paint, methacrylic resin paint, and epoxy-acrylic resin paint.

The electric wire protection member 1 of this working example includes the resin coating 3 that has at least one of a glass transition point of 40° C. or higher and a water vapor permeability coefficient of 260 g·mm/m$^2$·24 hr or less, and has a thickness of 30 μm or more. Therefore, deterioration of the adhesion between the resin coating 3 and the metal pipe 2 due to contact with moisture can be suppressed. As a result, the occurrence of breakage and swelling of the resin coating 3 and separation of the resin coating 3 from the metal pipe 2 can be suppressed for a long period of time.

Experimental Examples

With these experimental examples, the adhesion of the resin coatings 3 made of various types of resin paint to the metal pipe 2 was evaluated. The types of resin paint used in these experimental examples are as follows. It should be noted that all of these types of resin paint are ultraviolet-curable acrylic resin paint.

Resin Paint

Resin paint A: Product number "TB3006D" manufactured by ThreeBond Co., Ltd.

Resin paint B: Product number "TB3013Q" manufactured by ThreeBond Co., Ltd.

Resin paint C: Product number "TB3017F" manufactured by ThreeBond Co., Ltd.

Evaluation of Physical Properties of Resin Coating

Glass Transition Point

After being applied to a flat plate, each resin paint was cured with ultraviolet irradiation, and the resin coatings 3 were thus formed. Dynamic viscoelasticity was measured using, as measurement pieces, the resin coatings 3 removed from the flat plates. The peak temperature of a tan δ-temperature T curve obtained through the measurement of dynamic viscoelasticity was taken as the glass transition point. The glass transition points of the resin coatings 3 were as shown in Tables 1 to 3.

It should be noted that the specific measurement conditions for the measurement of dynamic viscoelasticity were as follows.

| | |
|---|---|
| Measurement frequency | 1 Hz |
| Measurement temperature | −40 to 150° C. |
| Temperature increase rate | 3° C./minute |
| Measurement strain | 1% |

Water Vapor Permeability Coefficient

The resin coatings 3 formed through the same method as described above were removed from flat plates and used as samples. Water vapor permeability was measured through the cup method prescribed in JIS Z0208. A water vapor permeability coefficient was calculated by multiplying the obtained water vapor permeability by the thickness of the sample. The water vapor permeability coefficients of the resin coatings 3 were as shown in Tables 1 to 3. It should be noted that the measurement temperature was set to 80° C.

Evaluation of Adhesion to Metal Pipe 2

The electric wire protection members 1 (specimens 1 to 9) in which the surfaces of the metal pipes 2 made of an aluminum alloy were covered with the resin coatings 3 as shown in Tables 1 to 3 were produced. The specimens were immersed in hot water at 100° C. for 30 hours to allow moisture to permeate the resin coatings 3. After 30 hours, a cross-cut adhesion test was performed using the specimens removed from the hot water.

Specifically, the cross-cut adhesion test was performed according to the following procedure. First, the resin coating 3 of each of the specimens was notched in the form of a lattice using a utility knife to produce one hundred square-shaped small pieces of the resin coating 3. Next, adhesive tape (cellophane adhesive tape No. 405 for packaging manufactured by Nichiban Co., Ltd) was attached to the portion that had been notched in the form of a lattice. Then, the adhesive tape was removed from the specimen, and the number of the small pieces attaching to the adhesive tape was counted. Tables 1 to 3 show the results. It should be noted that the length of one side of each small piece was set to 1 mm.

TABLE 1

Table 1

| | | Specimen 1 | Specimen 2 | Specimen 3 |
|---|---|---|---|---|
| Resin coating 3 | Resin paint | Resin paint A | Resin paint A | Resin paint A |
| | Glass transition point (° C.) | 50 | 50 | 50 |
| | Water vapor permeability coefficient (g · mm/m² · 24 hr) | 220 | 220 | 220 |
| | Thickness (μm) | 30 | 20 | 10 |
| Evaluation results | Evaluation of adhesion (number of pieces) | 0 | 20 | 100 |
| | Total evaluation | A | B | B |

TABLE 2

Table 2

| | | Specimen 4 | Specimen 5 | Specimen 6 |
|---|---|---|---|---|
| Resin coating 3 | Resin paint | Resin paint B | Resin paint B | Resin paint B |
| | Glass transition point (° C.) | 40 | 40 | 40 |
| | Water vapor permeability coefficient (g · mm/m² · 24 hr) | 260 | 260 | 260 |
| | Thickness (μm) | 30 | 20 | 10 |
| Evaluation results | Evaluation of adhesion (number of pieces) | 0 | 40 | 100 |
| | Total evaluation | A | B | B |

TABLE 3

Table 3

| | | Specimen 7 | Specimen 8 | Specimen 9 |
|---|---|---|---|---|
| Resin coating 3 | Resin paint | Resin paint C | Resin paint C | Resin paint C |
| | Glass transition point (° C.) | 30 | 30 | 30 |
| | Water vapor permeability coefficient (g · mm/m² · 24 hr) | 300 | 300 | 300 |
| | Thickness (μm) | 30 | 20 | 10 |
| Evaluation results | Evaluation of adhesion (number of pieces) | 20 | 60 | 100 |
| | Total evaluation | B | B | B |

As shown in Tables 1 to 3, specimens 1 and 4 included the resin coatings 3 that had at least one of a glass transition point of 40° C. or higher and a water vapor permeability coefficient of 260 g·mm/m²·24 hr or less, and had a thickness of 30 μm or more. Therefore, in the evaluation of adhesion, the pieces of the resin coatings 3 did not separate from the metal pipes 2, and excellent adhesion was exhibited.

On the other hand, specimens 2 and 3, and specimens 5 and 6 included the resin coatings 3 that had a thickness of less than 30 μm, and therefore, in the evaluation of adhesion, the pieces of the resin coatings 3 separated from the metal pipes 2. It can be understood from the comparison of specimens 1 to 6 that the thinner the resin coating 3 was, the larger the number of the pieces separating from the metal pipe 2 in the evaluation of adhesion was, thus leading to deterioration of the adhesion due to the permeation of moisture.

Specimens 7 to 9 included the resin coatings 3 that had neither a glass transition point of 40° C. or higher nor a water vapor permeability coefficient of 260 g·mm/m²·24 hr or less, and therefore, the pieces of the resin coatings 3 separated from the metal pipes 2 in the evaluation of adhesion irrespective of the thicknesses.

It can be sufficiently understood from these results that setting at least one of the glass transition point and the water vapor permeability coefficient to be within the above-mentioned respective specific ranges as well as setting the thickness to be within the above-mentioned specific range makes it possible to suppress the permeation of moisture into the resin coating 3, thus enabling the suppression of the occurrence of breakage and swelling of the resin coating 3 and separation of the resin coating 3 from the metal pipe 2 for a long period of time.

It should be noted that the present invention is not limited to the aspects of Working Example and Experimental Examples as described above, and it will be appreciated that various modifications can be made as appropriate without impairing the gist of the present invention.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. An electric wire protection member comprising:
    a metal pipe into which an electric wire is to be inserted; and
    a resin coating that covers an outer surface of the metal pipe,
    wherein the resin coating has
        at least one of a glass transition point of 40° C. or higher and a water vapor permeability coefficient of 260 g·mm/m$^2$·24 hr or less, and
        a thickness of 30 μm or more.

2. The electric wire protection member according to claim 1, wherein the resin coating contains any of a cross-linked acrylic resin, a cross-linked methacrylic resin, a cross-linked urethane-acrylic resin, and a cross-linked epoxy-acrylic resin.

3. The electric wire protection member according to claim 1, wherein the resin coating has a color tone that is different from that of the metal pipe.

4. A wire harness comprising:
    the electric wire protection member according to claim 1; and
    an electric wire inserted into the metal pipe of the electric wire protection member.

* * * * *